United States Patent
Sautter, Jr.

(10) Patent No.: US 9,334,689 B2
(45) Date of Patent: May 10, 2016

(54) INTERIOR LADDER RACK

(71) Applicant: Adrian Steel Company, Adrian, MI (US)

(72) Inventor: Robert H. Sautter, Jr., Cement City, MI (US)

(73) Assignee: Adrian Steel Company, Adrian, MI (US)

( * ) Notice: Subject to any disclaimer, the term of this patent is extended or adjusted under 35 U.S.C. 154(b) by 0 days.

(21) Appl. No.: 14/633,195

(22) Filed: Feb. 27, 2015

(65) Prior Publication Data
US 2015/0251607 A1    Sep. 10, 2015

Related U.S. Application Data

(60) Provisional application No. 61/947,734, filed on Mar. 4, 2014.

(51) Int. Cl.
| | |
|---|---|
| B60R 7/00 | (2006.01) |
| E06C 5/24 | (2006.01) |
| B60R 11/02 | (2006.01) |
| B60R 11/00 | (2006.01) |
| B60N 3/10 | (2006.01) |
| B60R 5/04 | (2006.01) |

(52) U.S. Cl.
CPC . *E06C 5/24* (2013.01); *B60N 3/103* (2013.01); *B60R 5/04* (2013.01); *B60R 11/00* (2013.01); *B60R 11/02* (2013.01); *B60R 11/0241* (2013.01)

(58) Field of Classification Search
CPC .... B60R 11/00; B60R 11/02; B60R 11/0241; B60N 3/103
USPC ............... 224/548, 547; 182/127, 211, 96; 296/37.13, 37.8, 153; 414/462
See application file for complete search history.

(56) References Cited

U.S. PATENT DOCUMENTS

| | | | | |
|---|---|---|---|---|
| 2,080,527 | A * | 5/1937 | Bixel | B60R 9/02 182/127 |
| 3,411,607 | A * | 11/1968 | Otten | E06C 9/14 182/76 |
| 4,413,801 | A * | 11/1983 | Lancaster | E06C 5/24 224/405 |
| 4,492,286 | A * | 1/1985 | Lemire | E06C 5/02 182/127 |
| 5,046,582 | A * | 9/1991 | Albrecht | E06C 5/02 182/127 |
| 6,003,633 | A * | 12/1999 | Rolson | E06C 5/02 182/106 |
| 6,012,545 | A * | 1/2000 | Faleide | B60R 3/02 182/127 |
| 6,196,605 | B1 * | 3/2001 | Baldas | B60R 7/046 224/543 |
| 8,857,689 | B2 * | 10/2014 | Levi | B60R 3/005 224/497 |
| 2006/0108179 | A1 * | 5/2006 | Sieb | B60R 3/005 182/127 |
| 2006/0261623 | A1 * | 11/2006 | Kuznarik | B62D 33/0273 296/62 |
| 2010/0089695 | A1 * | 4/2010 | McIntire | E04F 11/064 182/77 |

* cited by examiner

*Primary Examiner* — J. Gregory Pickett
*Assistant Examiner* — Lester L Vanterpool
(74) *Attorney, Agent, or Firm* — Marshall & Melhorn, LLC

(57) ABSTRACT

A mounting system for detachably storing ladders comprising at least one elongate member with a length and opposed first and second ends. The system also includes a ledge adapted to be movable along the length of the elongate member. A securing latch is provided which is adapted to be movable along the length of the elongate member. The securing latch is pivotally carried on the elongate member. The securing latch can have a gas spring with a body pivotally attached to the elongate member and a rod pivotally attached to the latch. The latch has a profile complimentary to a surface of said ladder.

2 Claims, 3 Drawing Sheets

INTERIOR LADDER RACK

CROSS-REFERENCE TO RELATED APPLICATION

This application claims priority to U.S. Provisional Patent Application No. 61/947,734 filed on Mar. 4, 2014, which is hereby incorporated by reference in its entirety.

FIELD OF THE DISCLOSURE

This disclosure relates to vehicle racks that facilitate loading and unloading of a ladder, and more particularly to a ladder rack that is mounted within the interior of a vehicle.

BACKGROUND OF THE DISCLOSURE

Transporting ladders in vehicles has been a persistent issue in the field. It is known to transport ladders on vehicles when the ladders are mounted on the outside of the vehicles. Oftentimes, there are racks and carriers made for this purpose that can be mounted to the outside or roof of the vehicle. However, there are instances where it is desired to transport ladders in the interior of the vehicle. While it is an easy matter to stack ladders in the interior space of a vehicle, it is necessary to carry the ladders in the interior of the vehicle such that they are secured into place and do not move responsive to the movement of the vehicle, and that are easily removed and remounted into stored location in the vehicle.

SUMMARY

In one embodiment, there is disclosed a system to carry ladders in a vehicle interior, such as a van, that permits storage of ladders in a variety of locations to maximize space usage, wherein the ladders can be stored on the vehicle walls, or doors or even partitions within the interior of the vehicle. The system includes an elongate member vertically mountable to an interior wall or partition of a vehicle, a ledge for supporting a bottom rung of a ladder, and a latch pivotably secured to the elongate member and adapted to engage a top portion of a ladder. The latch can have a rear leg portion extending downwardly from a central portion to engage a rear top portion of a ladder, and a forward leg portion extending downwardly from the central portion to engage a forward top portion of a ladder. One or both of the ledge and latch can be adapted to be movable and securable along the elongate member to accommodate ladders of different sizes.

DETAILED DESCRIPTION

Figure 1:
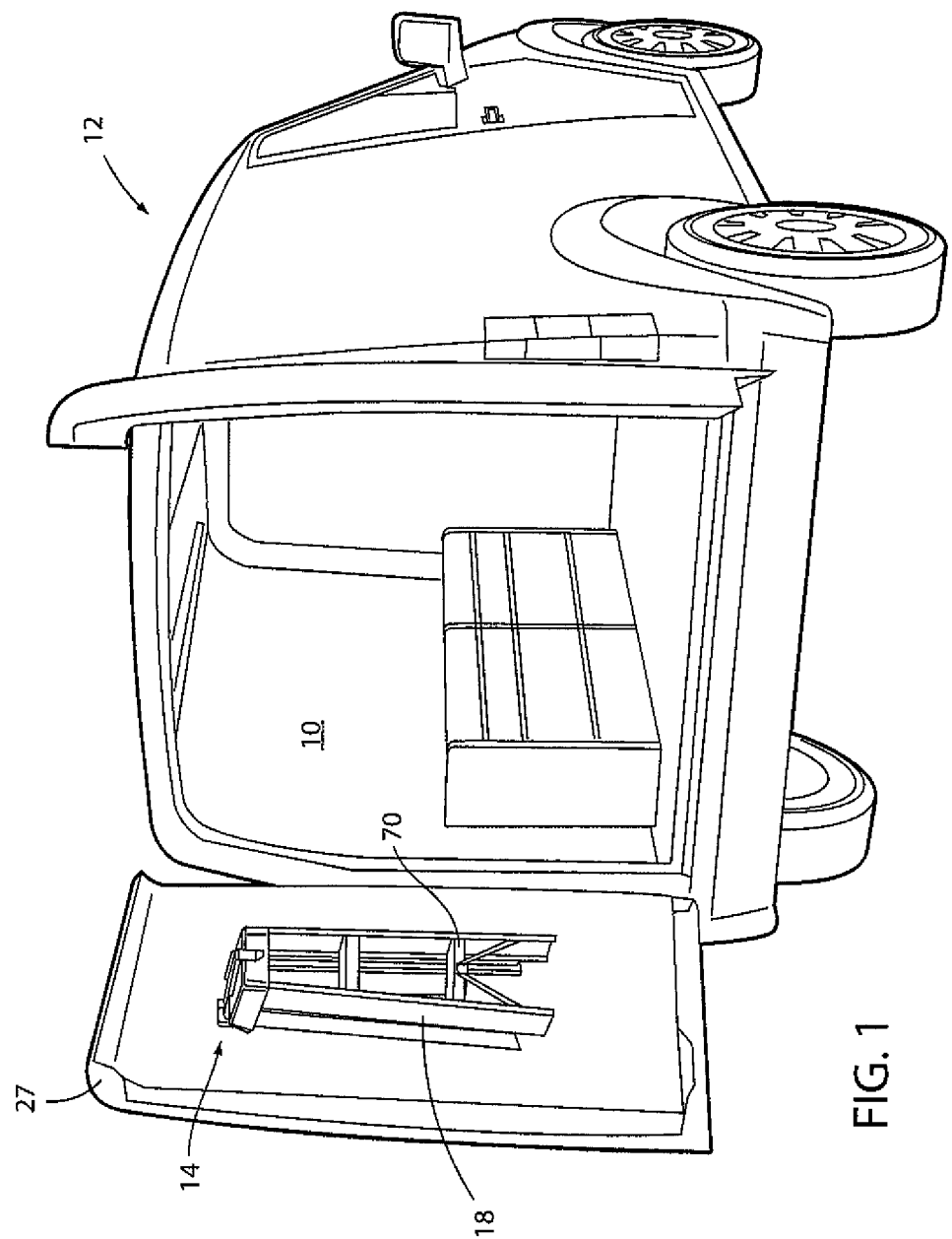
FIG. 1 is a perspective view of a vehicle interior with a ladder stored in the vehicle in accordance with one embodiment of the mounting system of this disclosure.

Turning now to the drawings wherein like numbers refer to like structures, FIG. 1 is a sectional view of the interior 10 of vehicle 12 showing one orientation of a rack or ladder storage system 14. The ladder 18 shown in FIG. 1 can be any of a variety of sizes, and shapes. The ladder storage system can be located on an interior vehicle wall, such as on the interior side of the vehicle door 27 in a vertical orientation.

Figure 2:
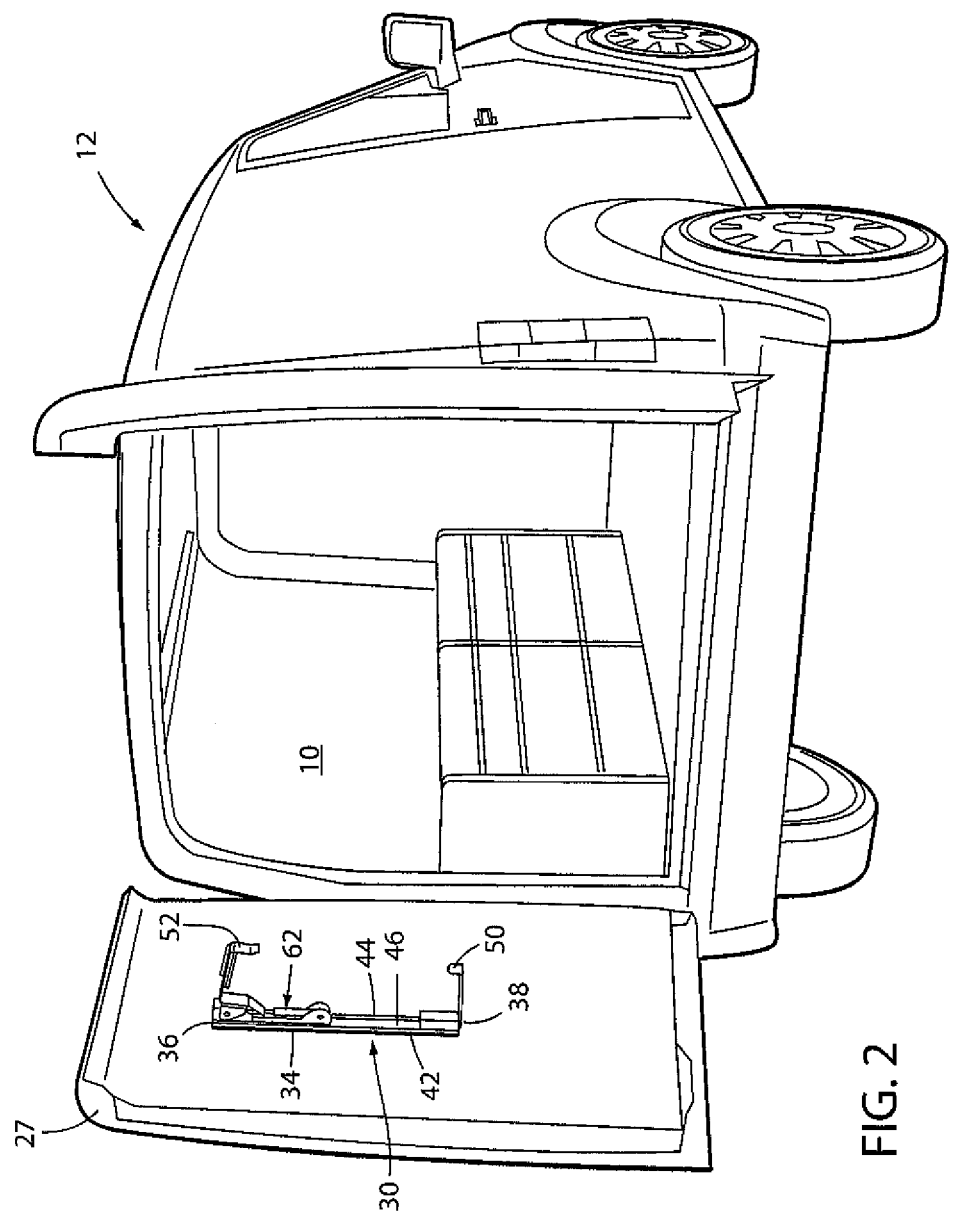
FIG. 2 is a perspective view of the vehicle interior of FIG. 1 showing the mounting systems without the ladder.
Figure 3:
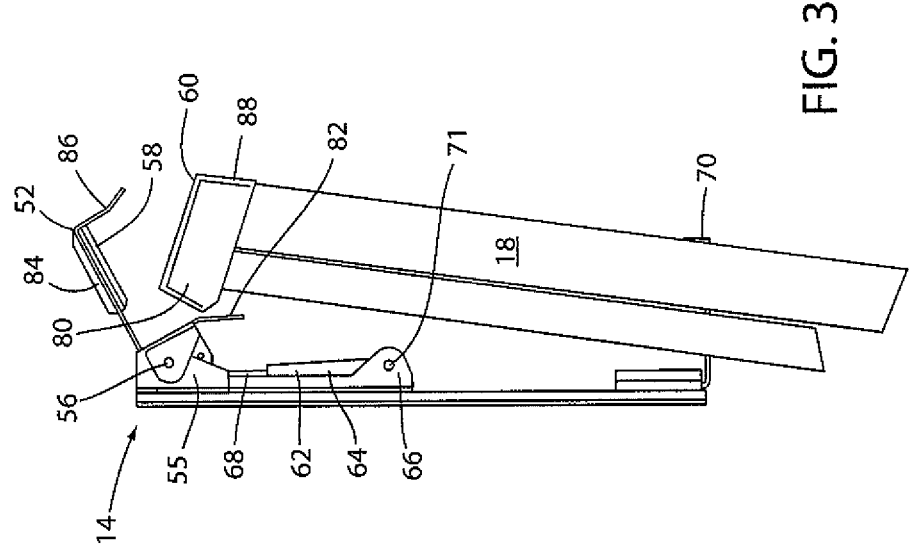
FIG. 3 is an elevated side view of a ladder being placed on the mounting system of FIG. 2.

FIG. 2 shows the interior of vehicle 12 wherein the ladder is removed revealing the mounting systems 14 for ladder 18. The mounting system 14 is comprised of vertically oriented elongate member 34, having a first end 36, and opposite second end 38 which define a height. The vertical member 34 has opposite sidewalls 42 and 44 in substantially parallel orientation to each other and separated by a recessed front face 46 to define a guide. A support ledge 50 may be equipped with flanges complimentary to the orientation of the sidewalls such that support ledge 50 may be adjustably slidably positioned along the height 40 of the vertical member 34. Securing latch 52 is provided in the mounting system and is also of similar profile as ledge 50 such that it is slidably adjustable along the length of the guide. As seen in FIG. 3, the securing latch 52 is pivotally affixed on a flange 55 at pivot 56 and extends outwardly away from the recessed front face 46. Latch 52 has a profiled surface 58 that conforms to a surface 60 of the ladder, and a gas spring 62 having a cylinder 64 pivotally carried by flange 66 extending outwardly away from recessed front face 46 and equipped with a rod 68.

Figure 4:
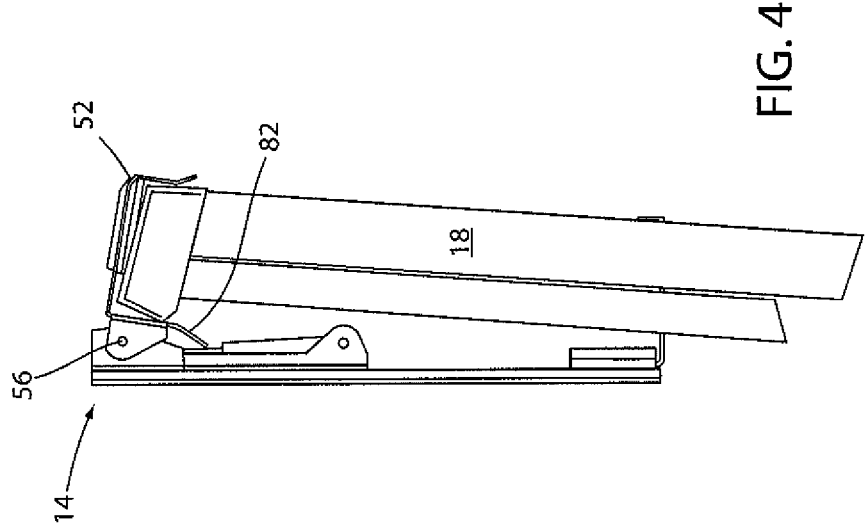
FIG. 4 is an elevational side view of the ladder of FIG. 3 secured on the mounting system.

The gas spring is used to lock latch 52 in place to secure ladder 18 in position. Rod 68 is attached to the latch and when the latch is moved into the secure position shown in FIG. 4, an end of rod 68 travels toward pivot 71 generating a constant spring force to clamp ladder 18 in place. When latch 52 is moved to its open or un-latched position, the end of rod 68 moves to release the ladder and hold latch 52 open until the ladder is loaded once again.

In operation, ledge 50 of ladder 18 is positioned on guide 48 along the length of the transverse member and is secured into a desired place. Ladder 18 is positioned on ledge 50 such that the ladder rung 70 rests on ledge 50. Ladder 18 is placed on the ledge 50 and then pivoted into place to interact with latch 52. In particular, a top rearward portion 80 of ladder 18 impinges on a rear leg portion 82 of latch 52 that extends downwardly from a central portion 84 of latch 52 causing latch 52 to rotate on pivot 56 when a ladder is positioned on ledge 50 and pushed forward, and a forward leg portion 86 of latch 52 engages a top forward portion 88 of ladder 18, thereby securing ladder 18 on rack 14. To remove ladder 18, latch 52 is released, ladder 18 is pivoted outwardly, and then ladder 18 is removed from the ledge 50.

Because both the ledge 50 and latch 52 are adjustable along a length of the elongate member 34, the ladder storage system 14 is fully adjustable to accommodate different sizes and different types of step ladders. Both latch 52 and ledge 50 can be coated with an energy absorbing material such as a plastisol material to protect ladders from damage during loading and unloading. The ladder storage system 14 automatically clamps and holds a ladder using a gas spring, allowing a person to hang a ladder on ledge 50 and push the ladder against the rear leg portion 82 to cause the ladder to be secured on the system 14.

The disclosure herein is only one embodiment of the invention. Those skilled in the art understand that the words herein are words of description, and not words of limitation. Many variations and modifications may be made without departing from the scope and spirit of the invention as set forth in the appended claims.

What is claimed as new and desired to be protected by Letters Patent of the United States is:

1. A mounting system for detachably storing ladders, comprising:
   at least one elongate member vertically mountable to an interior wall of a vehicle;
   ledge extending outwardly from the elongate member and adapted to be movable along and securable to the elongate member; and a latch adapted to be movable and securable along the elongate member, the latch being pivotably secured to the elongate member and including a rear leg portion extending downwardly from a central portion to facilitate engagement with a ladder to cause rotation of the latch, and a forward leg portion extending downwardly from the central portion to engage a forward top portion of the ladder to secure the ladder on the mounting system.

2. The system of claim 1, in which the latch is operably engaged with a gas spring secured to the elongate member to assist in rotating an upper end of the ladder outwardly upon unlatching of the latch from the ladder.

\* \* \* \* \*